(No Model.)
W. H. FROST.
CASE FOR DRIVING GEAR OF WHEELED VEHICLES.
No. 583,680. Patented June 1, 1897.
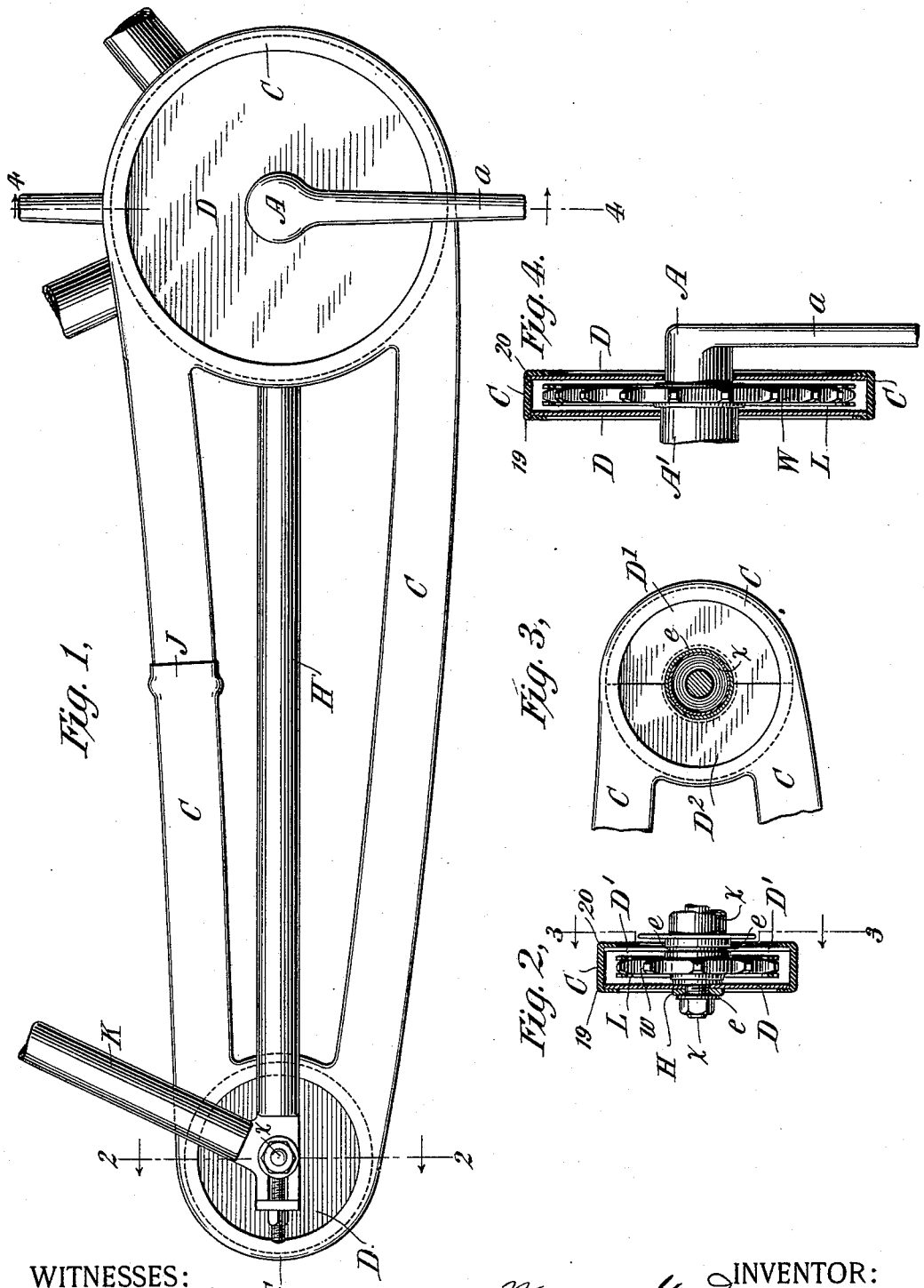
WITNESSES:
INVENTOR:

UNITED STATES PATENT OFFICE.

WARREN H. FROST, OF NEW YORK, N. Y., ASSIGNOR TO THE FROST GEAR CASE COMPANY, OF SAME PLACE.

CASE FOR DRIVING-GEAR OF WHEELED VEHICLES.

SPECIFICATION forming part of Letters Patent No. 583,680, dated June 1, 1897.

Application filed November 13, 1896. Serial No. 611,932. (No model.) Patented in France July 15, 1896, No. 258,085; in England July 15, 1896, No. 15,701, and in Germany July 15, 1896, No. 11,502.

*To all whom it may concern:*

Be it known that I, WARREN H. FROST, a citizen of the United States, and a resident of New York, in the county and State of New York, have made certain new and useful Improvements in Cases for the Driving-Gear of Wheeled Vehicles, (for which foreign patents have been obtained as follows: in France, No. 258,085, dated July 15, 1896; in Great Britain, No. 15,701, dated July 15, 1896, and in Germany, No. 11,502, dated July 15, 1896,) of which the following is a specification.

My invention is an improvement in cases for gear-wheels which form part of the driving-gear of wheeled vehicles, such as bicycles.

The object of my invention is to provide a light-weight noiseless casing, unobtrusive in appearance, effective to exclude dust, wet, and moisture, which may be easily and quickly removed and replaced when occasion requires.

The driving-gear of bicycles usually consists of two toothed wheels having a mechanical connection, such as a chain. I provide for each gear-wheel disks or plates, about the same diameter as the gear-wheel, one such plate or disk being placed upon each side of each wheel in such a manner that the wheel or its shaft or axle can turn freely while the disks or plates maintain a rigid stationary position. The disks or plates are composed of sheet metal or hard rubber or any material having sufficient rigidity to maintain its form and position. The two plates are united by a soft or flexible medium, such as soft rubber or slightly-vulcanized rubber, located adjacent to the periphery of the gear-wheel and having its edges stretched over and supported upon the edges of the described disks or plates. This permits of easily applying and removing the portion of the case immediately adjacent to the periphery of the gear-wheel, while the dust and moisture are effectively excluded. In applying the disks to the larger sprocket-wheel used in bicycles I place one disk firmly upon the bearing through which the main shaft passes. The second disk I mount upon the crank-axle in such a manner that the axle turns freely without rotating the disk. In applying the disks to the smaller sprocket-wheel I divide the inside disk upon a diametral line. The exterior disk I pass over the end of the axle, so as to permit the axle to turn freely while the disk remains stationary. I unite the two disks by a soft flexible medium, such as a strip or molded form of soft rubber, as described. Where the two wheels are mechanically connected by a sprocket-chain, I pass the chain through sections of soft-rubber tubing extending between the wheels, there being one section of tubing for each run of the chain. The ends of each tube-section are preferable integral with the flexible strip or medium uniting the peripheries of the disks. The tubes and peripheral coverings are preferably formed in one piece of soft rubber and cast in a mold.

The accompanying drawings illustrate my invention.

Figure 1 is a complete view of the improvement with the case in position. Fig. 2 is a cross-section of the smaller wheel and casing. Fig. 3 is a side view of the same. Fig. 4 is a view of the larger sprocket-wheel with the casing in section on the line 4, Fig. 1.

In Fig. 1 there is shown a portion of the frame of a bicycle, including the horizontal member H and the brace K, united to or integral therewith.

A is the crank-axle, and *a* is the pedal-crank.

W and *w* are two sprocket-wheels, power being transmitted from one to the other by a chain L. Upon opposite sides of the wheel W, I place two disks or plates D, of metal or hard rubber. The plate or disk D on the interior side of the wheel W is fixed upon the crank-axle bearing or box A'. It is held in position by friction or it may be fastened. The companion plate D upon the opposite or outer side has a central perforation of sufficient size to allow the crank-axle A to turn freely therein. This outer disk or plate D is therefore supported upon the crank-axle. The rear or smaller sprocket-wheel *w* is fixed upon the axle *x* of the rear or driving wheel. The interior disk is divided into two parts D' and D², Fig. 3. The companion or outer disk D is slipped over the end of the axle *x* after removing the nut and washer.

To complete the casing and inclose the chain and gear-wheels, I form or mold a part of the casing C of a material consisting of soft slightly-vulcanized elastic rubber. This is cast, molded, or formed in one piece. The portion applied to the wheels or located in proximity to the wheels is preferably in the form of three sides of a hollow square having corners like 19 and 20. The upper and lower runs of the chain pass through tubular sections. The upper tubular section is divided at J, this being necessary to enable its application to the smaller sprocket-wheel $w$, which is usually located within the frame H K, while the larger sprocket W is usually outside the frame.

To apply the casing, I remove sprocket-wheel W and the wheel $w$ and its axle, first dividing the chain, as usual. I then place the interior disk D upon the box or bearing A' of wheel W and the companion disk D upon the crank-axle A. (See Fig. 4.) I then replace these parts. I next apply the divided disks D' D² upon the interior side of wheel $w$, supporting it upon the axle or the axle box or bearing, according to the construction of the machine to which it is being applied. In all cases the disks remain stationary while the axle or wheel rotates. The exterior disk D is applied inside the nut and washer or equivalent device and rides upon the axle. I then pass the chain through the casing and place the wheel-casings in position by stretching them sidewise over the disks D, so that the disks lie upon the inside of the projecting flanges of the soft-rubber peripheral covering, as shown in the cross-sections, Figs. 3 and 4; but I may bifurcate or groove or divide the edges of the rubber peripheral covering, so as to engage the edge of the disk between the divisions of the edge, or I may fasten the soft-rubber projecting edges to the periphery of a disk or plate in any suitable manner, that shown in the drawings, wherein one is shown to lap the other, being as good as any known to me.

The peripheral wheel-coverings may be easily and quickly removed and replaced, and the disks D need never be disturbed.

What I claim, and desire to secure by Letters Patent, is—

1. In a wheeled vehicle the combination with the driving-gear of a case for a gear-wheel consisting of two disks located upon opposite sides of the wheel and a strip of soft elastic rubber having its edges stretched over and supported upon the edges of said disks in proximity to the periphery of said wheel, said case being suitably apertured for the driving connection of said gear, substantially as described.

2. In a wheeled vehicle, the combination with a gear-wheel constituting part of the driving-gear of said vehicle, of a casing inclosing said gear-wheel, the peripheral portion of said casing being composed of a strip of soft elastic rubber stretched over and supported by the rigid parts thereof, said casing being suitably apertured for the driving connection of said gear, substantially as described.

3. In a wheeled vehicle the combination with the driving-gear of cases for the gear-wheels each case consisting of two independent rigid disks located upon opposite sides of a wheel and a strip of soft, elastic rubber having its edges stretched over and supported upon the edges of said disks in proximity to the periphery of said gear-wheel, said cases being suitably apertured for the connection of said gears, substantially as described.

4. The combination with a gear-wheel, of a casing composed of a rigid support and a flexible and elastic portion surrounding the wheel, and retained by its elasticity upon said support, said casing being apertured for the driving connection of the gear-wheel, substantially as described.

WARREN H. FROST.

Witnesses:
FRANCES A. SPERRY,
WALTER S. PLACE.